July 31, 1951         A. H. PETERSEN ET AL         2,562,506
                       BATCH MIXING APPARATUS
Filed Jan. 31, 1949                              3 Sheets-Sheet 1

INVENTORS
ADOLPH H. PETERSEN
ROY K. CASTLEMAN
BY
Charles M. Fryer
ATTORNEY

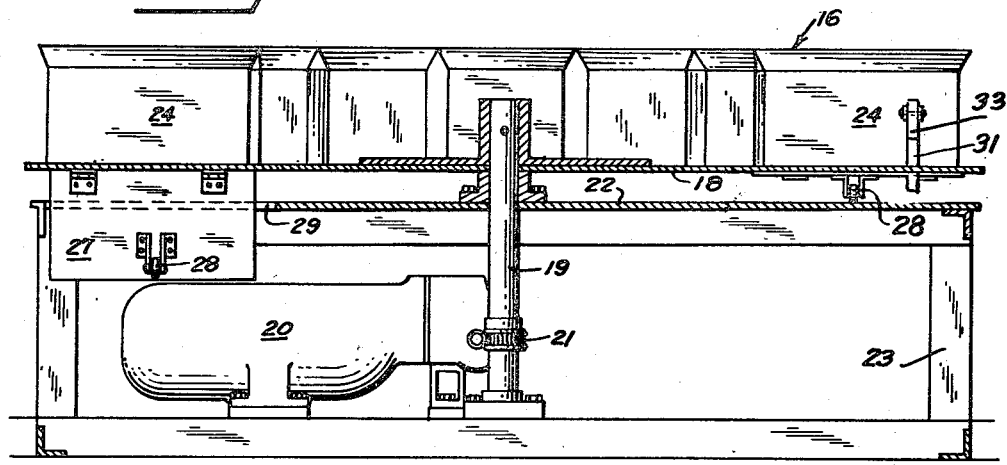
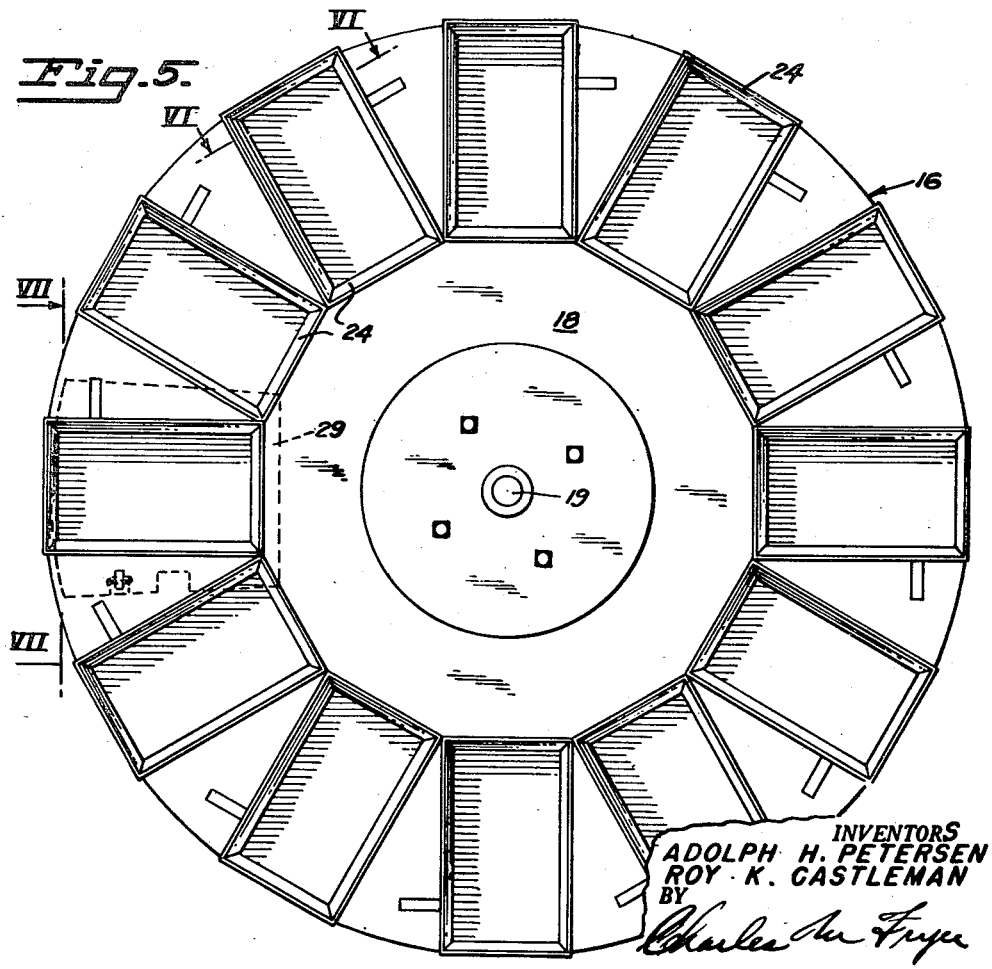

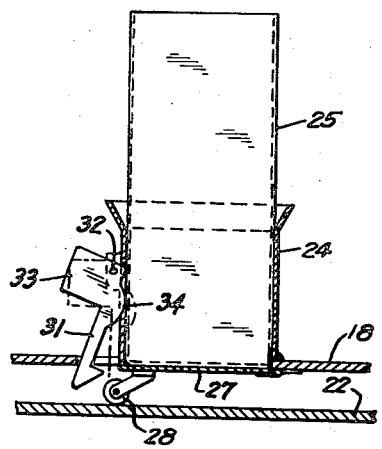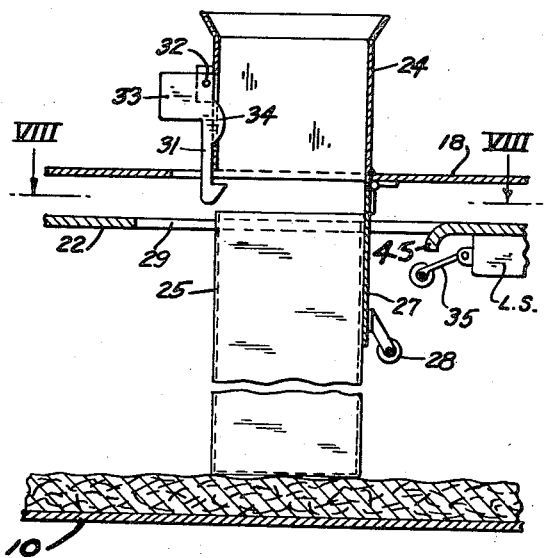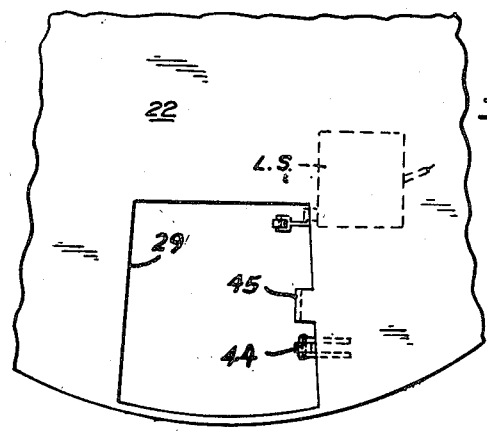

Patented July 31, 1951

2,562,506

UNITED STATES PATENT OFFICE 2,562,506

BATCH MIXING APPARATUS

Adolph H. Petersen and Roy K. Castleman, Antioch, Calif., assignors to Fibreboard Products Inc., San Francisco, Calif., a corporation of Delaware Application January 31, 1949, Serial No. 73,816

7 Claims. (Cl. 198—102)

This invention relates to batch mixing apparatus and particularly to apparatus for automatically measuring the several ingredients of a heterogeneous composition in proper proportions to produce a batch of a certain size.

For example, in the glass industry, raw materials are fed to a furnace in premixed batches in the following manner. The several materials forming the bulk of the batch are stored in bins and a scale associated with each bin is employed to weigh and to discharge onto a common conveyor the proper proportion of each material. The conveyor directs all of the materials toward a mixer in which they are thoroughly intermixed preparatory to being fed gradually into the molten charge of the furnace. Such a system operates successfully and may be operated automatically as disclosed in the application of Leland S. Rosener entitled "Automatic Conveying Apparatus," filed February 17, 1947, Serial No. 729,127. In addition to the principal components of glass, however, which are customarily measured in charges of several hundred pounds each to form a single batch of 3 to 5 tons in weight, there are other ingredients of lesser but more critical proportions. For example, a mixture of as many as eight or ten separate ingredients usually collectively referred to as decolorizer is added in lots of about twenty pounds to a batch of five tons. Some of the most critical ingredients are present in quantities of an ounce or less. Consequently, it is not practical to premix the decolorizer and weigh it off in twenty pound lots for each five ton batch as any failure of the ingredients present in very small quantities to become thoroughly disbursed would result in their unequal inclusion in successive batches.

It has been common practice, therefore, to prepare decolorizer in small packages or containers, usually paper bags, each having a carefully included quota of the most critical ingredients. One such paper bag with its mixed decolorizer ingredients has been tossed by hand into the mixture of each batch of principal ingredients. This requires an attendant, otherwise unnecessary where automatic batch making machinery is employed, and has the disadvantage that should the attendant fail to add the decolorizer, the batch would proceed to the furnace in its incomplete condition unnoticed by the furnace master.

It is the object of the present invention to provide batch mixing apparatus having means to add a bag or the like of premixed materials to the other ingredients of a batch automatically and also automatically to prevent delivery of any batch to which the bag has not been added. The manner of accomplishing this object and also further and more specific objects and advantages of the invention are made apparent in the following specification wherein reference is made to the accompanying drawings.

In the specification, the invention is disclosed in its application to the manufacture of glass though its adaptability to other industries where batches of ingredients are required to be mixed will be readily apparent.

In the drawings,

Fig. 4 is a central vertical sectional view through mechanism employed for depositing individual bags of mixed ingredients onto a conveyor belt.

Fig. 5 is a plan view of the mechanism illustrated in Fig. 4.

Fig. 6 is a fragmentary sectional view taken on the line VI—VI of Fig. 5.

Fig. 7 is a similar view taken on the line VII—VII of Fig. 5, and

Fig. 8 is a fragmentary plan view of a portion of the apparatus shown in Figs. 4 and 5 and taken on the line VIII—VIII of Fig. 7.

Figure 1:
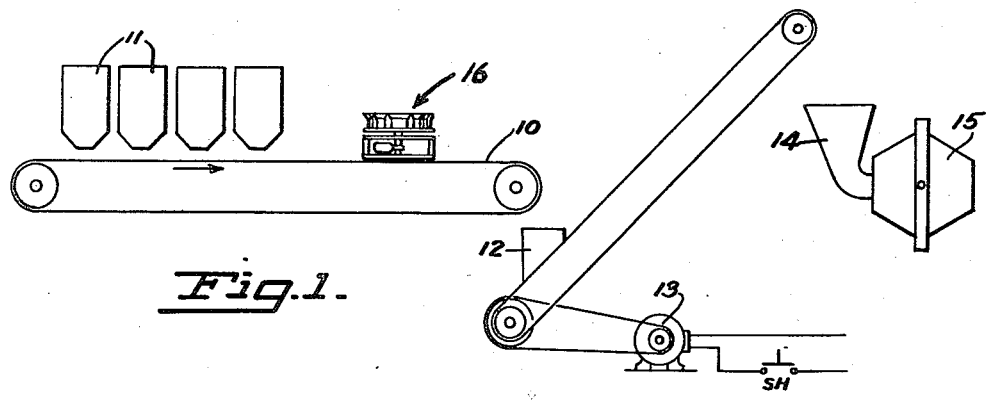
Fig. 1 is a schematic view of a batch mixing apparatus embodying the present invention.

Fig. 1 illustrates diagrammatically the apparatus of a batch mixing mechanism which includes an advanceable conveyor belt 10 upon which the several principal or more bulky ingredients of a batch are delivered from storage bins (not shown) through a group of scales 11 serving to weigh suitable proportions of the several ingredients before they are deposited on the belt. The entire batch thus carried by the belt is delivered to a mixer usually by a skip-hoist 12 driven by a motor 13 to deposit its contents into a hopper 14 of a mixer illustrated at 15. When thoroughly mixed, the contents of the mixer are transferred to further conveying mechanism (not shown) for delivery to a point of use such, for example, as the dog house of a conventional glass furnace.

In addition to the ingredients deposited on the belt 10 by the scales illustrated at 11, a relatively small quantity of other ingredients accurately proportioned is deposited on the belt 10 each time that a batch is directed to the mixer. It is principally to insure the inclusion of these latter ingredients and to prohibit the delivery of a batch to the mixer that does not include them that the present invention is directed and the invention is carried out in part by a turn-table mechanism illustrated at 16 in Fig. 1 disposed over the belt 10 between the scales 11 and the point where the batch is discharged into the skip-hoist 12.

Briefly, the manner in which the invention operates is as follows. A plurality of containers, usually paper bags, are supported by the turn-table mechanism and each time that all of the scales 11 are conditioned to deposit their charge upon the belt 10, the turn-table is actuated to release one of its containers of decolorizer onto the belt. The skip-hoist motor 13 operates periodically by closing of the switch shown at SH in Fig. 1 and this switch is closed only when a bag of decolorizer has been deposited on the belt. Thus, it is insured that this bag of mixed ingredients is added to each batch but, upon failure of its being added as might occur if the turn-table were not charged with full bags, the skip-hoist motor would not be energized and the incomplete batch could therefore not continue to the mixer nor to the furnace where it might otherwise be added to the properly proportioned molten mass of glass therein.

In Figs. 4 to 8 inclusive, of the drawings, the turntable structure, generally indicated at 16, is shown as comprising a rotatable table 18 carried by a shaft 19 to which rotation is imparted by a motor 20 through reduction gearing indicated at 21. A stationary table 22 underlies the table 18 and is supported on suitable framework such as indicated at 23. The turn-table 18 supports a plurality of radially spaced hoppers 24 each of a size to contain a bag 25 (see Fig. 6) of the ingredients which make up the decolorizer. Each hopper 24 has a hinged bottom 27 adapted to swing downwardly to discharge the contents of the hopper by gravity, but normally held in its upward or closed position by a castor 28 carried by the hinged bottom plate and bearing on the stationary table 22 as clearly shown in Fig. 6.

The stationary table 22 has a single opening 29 therein underlying the path followed by the hoppers 24 as the turn-table rotates and disposed above the conveyor belts 10. When the turn-table rotates, the first hopper 24, which contains a bag of decolorizer, discharges its contents onto the belt 10 as it passes over the opening 29 because of the fact that its bottom plate 27 swings downwardly through the opening 29 as shown in Fig. 7. If the hopper has not been charged with a bag of decolorizer, the bottom plate is prevented from opening by a latch 31 (see Figs. 6 and 7) pivoted as at 32 to the side of the hopper and having its latch end normally underlying an edge of the bottom plate 27 to retain it in its uppermost or closed position. The latch 31 has a weighted end 33 to bias it toward its latching position and also has a rounded projection 34 normally extending through a slot in the wall of the hopper for engagement by a bag of decolorizer contained by the hopper. Therefore, a full bag in the hopper engages the latch projection 34 and releases or disables the latch by swinging it outwardly to the position illustrated in Fig. 6. Thus, only on hoppers charged with decolorizer will the bottom plate 27 be permitted to swing through the opening 29 in the stationary table 22 and any empty hopper will pass over the opening with its bottom held in closed position.

When the bottom plate 27 of the hopper has, as shown in Fig. 7, swung downwardly to discharge the bag 25 onto the conveyor belt 10 it will, because of the continued rotary motion of the turn-table 18 toward the right as viewed in Fig. 7, contact a switch arm 35 of a limit switch LS secured to the bottom of the stationary table 22. Closing of the limit switch LS will, through circuits presently to be described, bring the turn-table to a stop and, subject to a pre-determined time delay, initiate operation of the skip-hoist to delivery to the mixer the batch deposited into it from the belt 10. Otherwise, and in the event that none of the hoppers 24 is charged with a bag of decolorizer, the latches 31 will prevent the bottom plates 27 from opening and because the limit switch is not closed, the turn-table will continue to rotate and the skip-hoist will not be energized to deliver its charge to the mixer.

Figure 2:
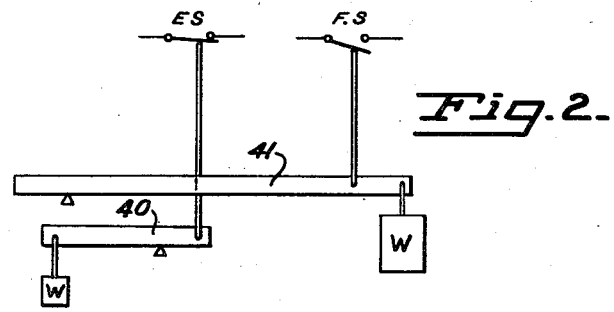
Fig. 2 is a schematic view of the balance beams of a conventional scale showing electric switches actuated by said beams.
Figure 3:
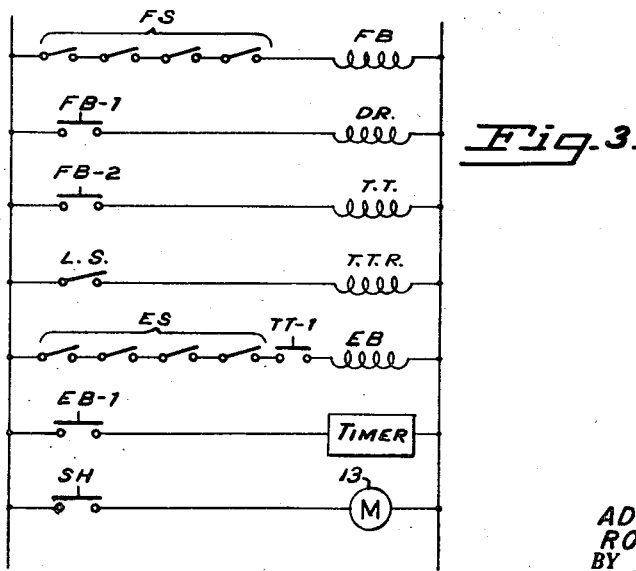
Fig. 3 is a wiring diagram illustrating circuits employed in the present invention.

In order to understand the circuits illustrated in Fig. 3, it must first be known that each of the scales 11, which are of conventional design, is provided with a pair of switches schematically illustrated in Fig. 2 as an empty switch ES connected with an empty balance beam 40 of the scale, the weight W of which is designed to counter-balance the empty hopper of the scale. Consequently, when the scale has discharged its load and is in an empty condition, the switch ES will be closed. A switch FS is controlled by the full balance beam 41 of the scale, the weight of which balances the full load to be discharged on the conveyor belt. Thus, when the beam 41 moves upwardly as the scale receives its predetermined load, the switch FS will be closed.

Now referring to the schematic wiring diagram shown in Fig. 3, the full balance switches of all the scales are shown at FS as in series and when all of these switches are closed, that is, by each of the several scales being fully balanced by its proportionate load, a full balance relay FB is closed to effect closing of two switches FB1 and FB2. The switch FB1 closes a circuit to a discharge relay DR which, through conventional mechanism not shown, effects discharge of the contents of all the scales onto the conveyor belt 10. The simultaneous closing of the switch FB2 effects energization of the turn-table motor 20 by closing the circuit to the turn-table relay TT which is of the self-locking or holding type. Thus, the turn-table is rotated until one of the bags of decolorizer carried by it is dropped onto the belt and the bottom plate of the hopper closes the limit switch LS which, as shown on the wiring diagram, energizes the turn-table release relay TTR which breaks the circuit to the turn-table motor 20 causing the turn-table to come to rest. This, of course, is effected by releasing the holding mechanism of the turn-table energizing relay TT. Energization of the relay TTR also causes closing of contact TT1 arranged in series with all of the empty balance switches ES of the several scales. At this time all of the empty balance switches will have been closed because the scales have discharged their respective loads, and closing of the switch TT1 therefore energizes the relay EB to close a switch EB1 acting through a timer to close the skip-hoist motor switch SH and thus energize the skip-hoist motor 13. The timer interposes sufficient delay to permit the conveyor belt 10 to discharge all of its contents into the skip-hoist before the skip-hoist is set in motion to deliver its contents to the mixer.

Any further rotation of the turn-table after its hinged bottom plate 27 has dropped through the opening 29 and actuated the limit switch 35 will cause the bottom plate automatically to be returned to its closed position where it will be held by the latch 31. To facilitate this closing of the bottom plate 27, there is positioned adjacent one edge of the opening 29, as best shown in Fig. 8, an anti-friction roller 44 arranged to engage the bottom plate and swing it upwardly as the turn-table moves. A downwardly bent lip 45 (see also Fig. 7) is also formed on the edge of the opening 29 and acts as a ramp over which the roller 28 rides as the bottom plate is swung upwardly.

With the construction herein illustrated and described, the contents of one of the bags 25, which in the case of the manufacture of glass will be the mixture known as decolorizer, is deposited onto the conveyor belt with the rest of the batch when and only when all of the scales have reached their full balance position and have discharged their contents onto the conveyor. Furthermore, upon failure of the turn-table to be charged with even a single bag of decolorizer, the heavier portions of the batch already discharged onto the conveyor 10, will be deposited into the skip-hoist but will not be delivered to the mixer. The failure of this batch to reach the furnace indicates to the furnace master that the batch is incomplete and requires the addition thereto of the missing components before the apparatus will be set to resume its automatic operation.

We claim:

1. In apparatus for mixing and delivering batches of granular materials or the like which includes a conveyor to receive proportioned amounts of materials and deliver them toward a mixer, means to discharge a container of material onto the conveyor, means operable upon the conveyor receiving an otherwise complete batch to initiate operation of the container discharging means, and means operable only after a said container is discharged onto the conveyor to deliver the batch to the mixer.

2. In batch mixing apparatus including a conveyor and means to deposit measured quantities of batch ingredients thereon for delivery to a mixer, delivery means to receive a batch from the conveyor and deliver it to the mixer, apparatus to add a package of ingredients to the conveyor, and means to effect operation of said apparatus only when the other ingredients have been deposited on the conveyor.

3. In batch mixing apparatus including a conveyor and means to deposit measured quantities of batch ingredients thereon for delivery to a mixer, delivery means to receive a batch from the conveyor and deliver it to the mixer, apparatus to add a package of ingredients to the conveyor, means to effect operation of said apparatus only when the other ingredients have been deposited on the conveyor, and means to actuate the delivery means only when the package has been added to the conveyor.

4. In batch mixing apparatus including a conveyor and means to deposit measured quantities of batch ingredients thereon for delivery to a mixer, delivery means to receive a batch from the conveyor and deliver it to the mixer, apparatus to add a package of ingredients to the conveyor, means to effect operation of said apparatus only when the other ingredients have been deposited on the conveyor, and means to actuate the delivery means only when the package has been added to the conveyor and the contents of the conveyor have been discharged to the delivery means.

5. In batch mixing apparatus including a conveyor and means to deposit measured quantities of batch ingredients thereon for delivery to a mixer, delivery means to receive a batch from the conveyor and deliver it to the mixer, apparatus to add a package of ingredients to the conveyor, means to effect operation of said apparatus only when the other ingredients have been deposited on the conveyor, and means to actuate the delivery means and to discontinue operation of said apparatus only when the package has been added to the conveyor.

6. In batch mixing apparatus including a conveyor to receive ingredients of a batch and deliver them toward a mixer, a device for adding a package of ingredients to each batch on the conveyor comprising a turn-table rotatable over the conveyor, receptacles on the turn-table each to receive a said package, a hinged bottom on each receptacle to discharge its package onto the conveyor, latch means holding said bottom closed and releaseable by the presence of a package in the conveyor, and means under the turn-table holding the bottoms closed at all but one position directly over the conveyor.

7. In batch mixing apparatus including a conveyor to receive ingredients of a batch and convey them to delivery mechanism which carries them to a mixer, a device for adding a package of ingredients to each batch on the conveyor comprising a turn-table rotatable over the conveyor, receptacles on the turn-table each to receive a said package, a hinged bottom on each receptacle to discharge its package onto the conveyor, means under the turn-table supporting the bottoms in closed position except at a discharge station, and an electric switch engageable by the bottom of a receptacle opening at said station to close a circuit to said delivery mechanism for carrying the batch from the conveyor to the mixer.

ADOLPH H. PETERSEN.
ROY K. CASTLEMAN.

REFERENCES CITED

The following references are of record in the file of this patent:

UNITED STATES PATENTS

| Number | Name | Date |
| --- | --- | --- |
| 1,715,968 | Weber | June 4, 1929 |
| 1,852,764 | Wentworth | Apr. 5, 1932 |
| 1,925,914 | Popov | Sept. 12, 1933 |
| 2,252,589 | Whitmore | Aug. 12, 1941 |
| 2,438,811 | Le Sage | Mar. 30, 1948 |